A. J. LIBERTY & L. A. KIRCHNER.
COMBINED FENDER AND MUD GUARD FOR AUTOMOBILES.
APPLICATION FILED JULY 1, 1910.
1,044,670.
Patented Nov. 19, 1912.
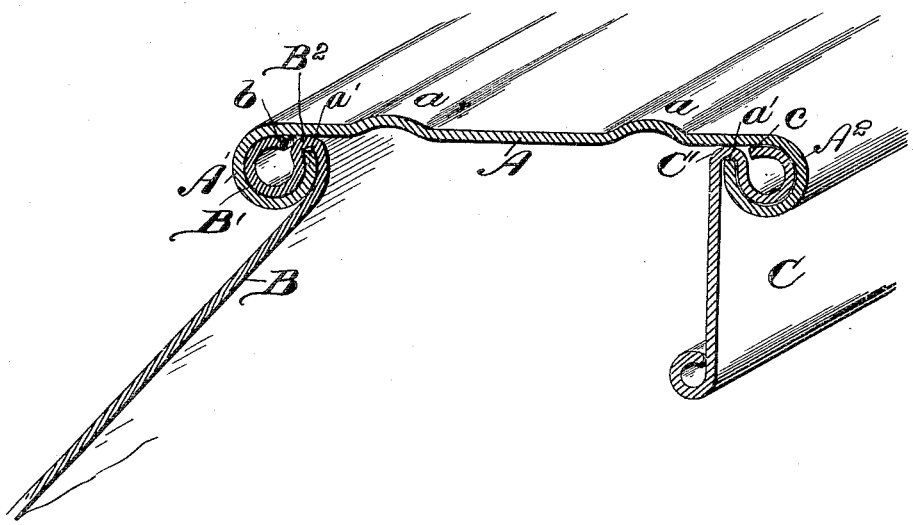

UNITED STATES PATENT OFFICE.

ANTOINE J. LIBERTY AND LOUIS A. KIRCHNER, OF DETROIT, MICHIGAN, ASSIGNORS TO DETROIT AUTO SPECIALTY COMPANY, OF DETROIT, MICHIGAN, A CORPORATION OF MICHIGAN.

COMBINED FENDER AND MUD-GUARD FOR AUTOMOBILES.

1,044,670.      Specification of Letters Patent.      Patented Nov. 19, 1912.

Application filed July 1, 1910. Serial No. 569,880.

*To all whom it may concern:*

Be it known that we, ANTOINE J. LIBERTY and LOUIS A. KIRCHNER, citizens of the United States, residing at Detroit, county of Wayne, State of Michigan, have invented a certain new and useful Improvement in Combined Fenders and Mud-Guards for Automobiles, and declare the following to be a full, clear, and exact description of the same, such as will enable others skilled in the art to which it pertains to make and use the same, reference being had to the accompanying drawings, which form a part of this specification.

Our invention relates to an improvement in a combined fender and mud guard for automobiles, shown in the accompanying drawings and more particularly set forth in the following specification and claims.

The object of the invention is an improvement in the general construction of fenders for automobiles with a view to reducing the cost of manufacture while producing a finished appearance and maintaining the strength of the device.

One purpose of the invention is to dispense with the usual reinforcing wire employed at the margin of the fender around which the edges of the fender, mud guard, and apron have heretofore been wrapped.

Another object is to dispense with the rivets for securing the mud guard and apron to the fender,—the present construction presenting a smooth unbroken surface for finishing; another object being to cover the raw edges of the metal forming the fender, mud guard, and apron by arranging the wall of the contiguous member so as to overlap or otherwise inclose the edge of the adjacent member.

Other advantages and improvements will hereafter appear.

The drawings show a fragmentary perspective view of the fender in cross-section.

Referring now to the letters of reference placed upon the drawings:—A denotes the fender proper provided with the usual stiffening beads $a$, $a$. The rims of the fender $A'$ and $A^2$ are given a tubular formation,— the edges $a'$ being spaced from the main wall of the fender sufficiently to receive the mud guard B, and apron C respectively. The mud guard B is also given a tubular formation and its edge as indicated at $B'$, is sleeved within the tubular rim $A'$ of the fender. At $B^2$ the mud guard is formed with a return bend in which is lodged the edge $a'$ of the fender protecting and hiding it from view and exposure to the elements and thereby insuring it against corrosion. The edge $b$ of the mud guard is also hidden from view due to the return bend $B^2$ contacting with the fender as clearly shown in the drawings.

The manner of joining the apron C to the edge of the fender A is similar to that of the mud guard. The return bend $C'$ of the apron inclosing the edge $a'$ of the fender while the edge $c$ of the apron is hidden from view by the return bend $C'$ contacting with the main wall of the fender as in the former case. The lower rim of the apron C is also given a tubular formation,—the edge of the metal projecting inwardly.

Having thus described our invention, what we claim is:—

1. A combined fender and mud guard composed of two members, the fender member having one edge bent toward the body of the fender member with its edge terminating short of the body, and the mud guard having one edge bent to fit within the bent portion of the fender member with its edge shielded within the bent portion of the fender member, the mud guard adjacent its bent portion being formed to overlap the free edge of the tubular part of the fender member and shield the free edge of the bent part of the fender member.

2. A combined fender and mud guard composed of two members, the fender member having one edge bent toward the body of the fender member with its edge terminating short of the body, and the mud guard having one edge bent to fit within the bent portion of the fender member with its edge shielded within the bent portion of the fender member, the mud guard adjacent its bent portion being formed to overlap the free edge of the bent part of the fender member and shield the free edge of the bent part of the fender member, said free edge of the bent part of the fender member binding said overlapping portion of the mud guard against the body of the fender member.

3. A combined fender and mud guard composed of two members, the fender member having one edge formed to provide a tubular portion and the mud guard having one edge formed to provide a tubular portion adapted to fit within the tubular portion of the fender member, the body of the mud guard and its tubular portion being constructed to coöperate with each other to overlap and embrace inner and outer surfaces of the tubular portion of the fender member, the free edge of the tubular portion of the fender member which is overlapped by the body of the mud guard and its tubular portion being adapted to force the body portion of the mud guard adjacent its tubular portion against the under side of the fender member.

In testimony whereof we sign this specification in the presence of two witnesses.

ANTOINE J. LIBERTY.
LOUIS A. KIRCHNER.

Witnesses:
GRACE E. WYNKOOP,
SAMUEL E. THOMAS.